UNITED STATES PATENT OFFICE 1,937,465

BEARING

Charles F. Sherwood, Pleasant Ridge, Mich., assignor to Sherwood Patents, Ltd., San Francisco, Calif., a corporation of California No Drawing. Application January 29, 1930
Serial No. 424,449

3 Claims. (Cl. 75—1)

It has heretofore been proposed to produce a bearing material composed essentially of powdered copper and tin, with a suitable lubricant, compressed to form a briquette and made into a homogeneous mass by sintering in a cyanide bath or other reducing atmosphere. Such a material has certain very definite advantages.

It is my proposal to improve upon bearings of this character by adding to the materials used therein a small amount of powdered iron. The iron will be interspersed throughout the structure and will form hard points within the bronze matrix, serving to carry the shaft or other load on the bearing much in the same manner as the lead tin antimony eutectic formed in babbit produces hard crystals which carry the load on the bearing.

While various proportions of materials may be used and various means of treating or sintering them may be employed, I have obtained satisfactory results from a mixture of about 84% copper, about 10% tin, about 5% iron, and one half of one per cent or one per cent stearic acid. All of these materials are in powdered form and should be thoroughly mixed. After being mixed they may be subjected to pressure in a mold for the purpose of forming them into the desired shape. The briquette so formed may then be heated in a reducing atmosphere, such as hydrogen, a cyanide bath, or the like, to a temperature of about 1450 degrees F. This heat will drive off the stearic acid, form the copper and tin into a bronze and definitely sinter the particles into a homogeneous structure. The heat employed is not sufficient to melt the iron or to cause it to alloy with any of the other metals. It will, therefore, be held in the bronze matrix in unalloyed condition.

The introduction of iron with the other powdered metals increases the durability and hardness of the bushing. The iron points will carry the shaft or other load imposed upon the bearing and, being held by the softer bronze matrix, do not cut or score the shaft or other object carried by the bearing. By varying the proportions of metals any desired hardness suitable for any shaft or bearing load may be produced. Inasmuch as the iron or ferrous content is to be carried by a bronze or non-ferrous backing formed from the copper and tin, or other non-ferrous constituents, it is obviously desirable that the iron shall form a minor proportion of the structure. I intend that, in no event, shall it form more than 50% of the whole.

While I have herein disclosed a specific combination of metals, I desire it to be understood that my invention broadly embodies the combination of a relatively soft matrix formed from powdered metals and having a powdered harder metal interspersed therein.

It will be obvious that changes may be made in the particular metals used, as well as in the proportions thereof and in the process of treating the same. It is my intention to cover by my claims such changes as may be reasonably included within the scope of my invention.

What I claim is:

1. The method of producing sintered bodies such as bearings, bushings, or the like, comprising forming a mixture of powdered copper about 84%, powdered tin about 10% and powdered metallic iron about 5%, forming a briquette from the mix, and sintering the briquette to produce a relatively soft sintered matrix having hard points of unalloyed metallic iron therein.

2. A porous bearing metal composed of powdered copper about 84%, powdered tin about 10% and powdered iron about 5%, sintered into a rigid block and with the iron in unalloyed condition.

3. A rigid porous block of bearing metal composed of powdered copper and a relatively small quantity of powdered tin sintered together and intimately interspersed with powdered metallic iron in unalloyed condition in amount below 50% of the total metallic content of the block.

CHARLES F. SHERWOOD.